(12) United States Patent
Lones

(10) Patent No.: US 8,125,628 B1
(45) Date of Patent: Feb. 28, 2012

(54) LIGHT BAFFLING APPARATUS FOR HEADLAMP SENSOR

(76) Inventor: Joe J. Lones, San Diego, CA (US)

( * ) Notice: Subject to any disclaimer, the term of this patent is extended or adjusted under 35 U.S.C. 154(b) by 568 days.

(21) Appl. No.: 12/355,780

(22) Filed: Jan. 17, 2009

(51) Int. Cl.
G01J 1/00 (2006.01)

(52) U.S. Cl. ........................................ 356/121; 356/122

(58) Field of Classification Search .......... 356/121–137, 356/150–154, 213–229; 250/216, 221; 33/288, 33/335, 286, 264, 266, 293; 348/94, 95, 348/135
See application file for complete search history.

(56) References Cited

U.S. PATENT DOCUMENTS

| | | |
|---|---|---|
| 3,467,473 A | 9/1969 | Preston |
| 3,515,485 A | 6/1970 | Irwin |
| 3,532,432 A | 10/1970 | Mansour |
| 3,746,449 A | 7/1973 | Schick |
| 3,791,740 A | 2/1974 | Proefrock |
| 3,830,570 A | 8/1974 | Groetzner |
| 4,092,071 A | 5/1978 | Puyplat |
| 4,120,589 A | 10/1978 | Mima |
| 4,134,680 A | 1/1979 | Hunter |
| 4,634,275 A | 1/1987 | Yoshida |
| 4,647,195 A | 3/1987 | Ishikawa |
| 4,744,655 A | 5/1988 | Sdika |
| 4,907,877 A | 3/1990 | Fukuda |
| 4,970,403 A | 11/1990 | Krasutsky |
| 5,078,490 A | 1/1992 | Oldweiler |
| 5,170,220 A | 12/1992 | Matsumoto |
| 5,210,589 A | 5/1993 | Kaya |
| 5,318,172 A | 6/1994 | Kenny |
| 5,321,439 A | 6/1994 | Rogers |
| 5,331,393 A | 7/1994 | Hopkins |
| 5,373,357 A | 12/1994 | Hopkins |
| 5,379,104 A | 1/1995 | Takao |
| 5,392,111 A | 2/1995 | Murata |
| 5,426,500 A | 6/1995 | Ohana |
| 5,485,265 A | 1/1996 | Hopkins |
| 5,504,574 A | 4/1996 | Murata |
| 5,619,322 A | 4/1997 | Murata |
| 5,751,832 A | 5/1998 | Panter |
| 5,796,473 A | 8/1998 | Murata |
| 5,796,522 A | 8/1998 | Meyers |
| 5,818,571 A | 10/1998 | Prettyjohns |
| 5,861,628 A | 1/1999 | Genna |
| 7,275,847 B2 | 10/2007 | Kiyota |
| 7,876,427 B1 | 1/2011 | Melvin |
| 2002/0167657 A1 | 11/2002 | Tomasz |
| 2004/0263847 A1 | 12/2004 | Merle |
| 2006/0055811 A1 | 3/2006 | Fritz |
| 2006/0256320 A1 | 11/2006 | Peterson |

OTHER PUBLICATIONS

Adroit Engineering, Inc., "Headlamp Aim Comparative Audit System Application Notes," Jau. 17, 2001.
Zytek Communications Corporation, "Headlight Aim Comparative Audit System," http://www.zytek.com/~melvin/adroit.html, May 12, 2002.
Lones, J., and Peterson, K., "Practical Measure of Headlamp Beam Alignment in Vehicle Assembly," Current Developments in Lens Design and Optical Engineering VII, Proceedings of the SPIE, vol. 6288, Aug. 14, 2006, San Diego.

*Primary Examiner* — Tri T Ton
(74) *Attorney, Agent, or Firm* — Stephen W. Melvin

(57) ABSTRACT

A light baffle arrangement for sensors is used to limit the sensing field of view. Arranging multiple said limited view sensors in a linear array provides a means to accurately locate and analyze the position of a beam pattern along said array axis as in checking vehicle headlamp beam alignment.

12 Claims, 5 Drawing Sheets

LIGHT BAFFLING APPARATUS FOR HEADLAMP SENSOR

FIELD OF THE INVENTION

The present invention relates to systems and methods of industrial monitoring and quality control, and more specifically to systems and methods for detecting the alignment of vehicle headlamps.

BACKGROUND

At the end of World War II major building of the highway system we know today began in both the U.S. and Europe. In that era brightness of electric lamps was rated the same as commonly used today for the consumer, namely higher wattage produces higher brightness. It is important to understand that "brightness" is related to response of the human eye in the visible part of the spectrum which lies between the shorter wavelengths of ultraviolet and the longer wavelengths of infrared.

Freeways known today in the U.S. were only beginning to be built after the war;

therefore, nighttime road illumination was related to stopping safety in combination with close passing oncoming traffic. Therefore, for visibility safety the Department of Transportation (DOT) established vehicle headlamp wattage to be a maximum of 60 watts on the mainly two-way U.S. roads. In Europe of that reconstruction era the building of higher-speed roadways dictated vehicle headlamps at a maximum 65 watts for visibility safety. Those wattages remain in effect today.

In the mid to late 1990's technology for manufacturing electric arc type headlamps evolved in Europe. These vehicle arc lamps produce approximately three times the brightness of incandescent vehicle lamps, and arc lamp power consumption is one half the incandescent wattage. Combining those statistics results in a total efficiency improvement approximately six times that of incandescent lamps in the visible spectrum. Under these circumstances 35-watt electric arc lamps readily meet highway regulatory maximum wattage requirements both in the U.S. and Europe, even though they are much brighter to the eye! While that increased brightness is an improvement in night vision for drivers using arc lamps, at the same time there is a major risk of causing unsafe blindness in the oncoming traffic. Clearly there exists an ongoing nighttime vehicle headlamp lighting safety issue.

In order to establish nighttime road safety for both arc and incandescent sources DOT established sharp headlamp beam pattern regulations. It is now required that the beam pattern top be accurately aimed to relatively strict standards by vehicle manufacturers.

Vehicle headlamp alignment requires significant quality control to assure meeting DOT aiming standards. In the field of quality control it is necessary to measure at higher accuracy than the specified regulations. Variability of the human eye cannot meet the higher standards of accuracy and repeatability to evaluate headlamp beam vertical alignment; therefore, it is necessary to evaluate headlamp alignment with electro-optical instruments. In order to meet both quality and liability issues, it has become necessary to accurately measure headlamp alignment traceable to the U.S. National Institute of Standards and Technology (NIST).

By 1999 the U.S. vehicle producers began significant introduction of headlamp arc lamps in their products. In so doing quality control for headlamp aiming, also known as "headlamp audit", became a prime concern at Ford Motor Company. Early headlamp audit equipment at Ford used Adroit Engineering beam sensors without baffling to eliminate spill-over between left and right vehicle beams. This purposely created a need for the audit operator/driver to exit the vehicle and sequentially stand in front of each lamp while observing the audited position of the opposite lamp. Thereby variation of driver body weight was eliminated from the production statistical process control record.

To accomplish the foregoing this invention eliminates stray light sensor interference by introduction of sensor baffling. Having the driver exit the vehicle is still accomplished by a requirement to manually activate software recording of data from a position near the smart sensors.

BRIEF SUMMARY OF THE INVENTION

A light baffle arrangement for sensors is used to limit the sensing field of view.

Arranging multiple said limited view sensors in a linear array provides a means to accurately locate and analyze the position of a beam pattern along said array axis as in checking vehicle headlamp beam alignment.

DETAILED DESCRIPTION

Figure 1:
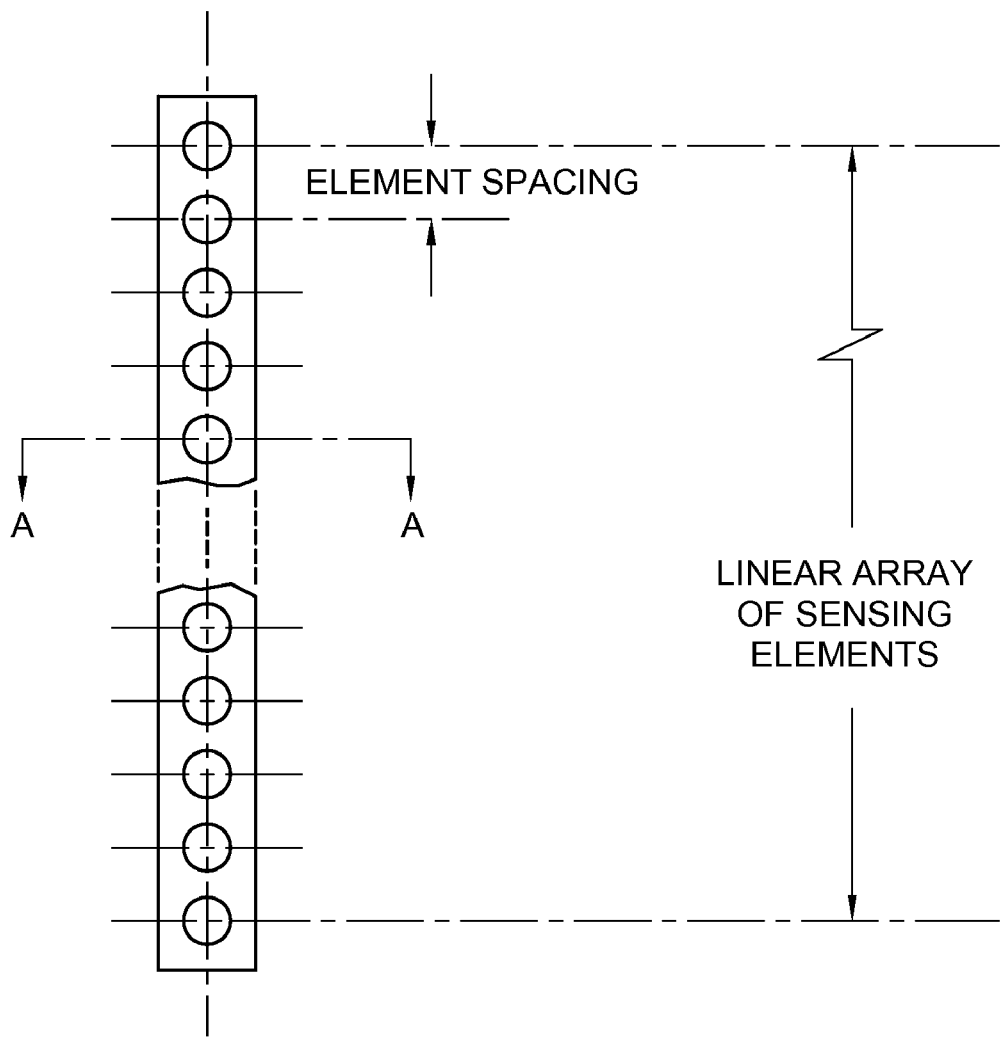
FIG. 1 illustrates a vertical array configuration of sensing elements.

Referring to FIG. 1, a front view of a typical arrangement of sensor elements is shown wherein the elements are accurately spaced along the linear axis of an array. In use the array axis is oriented in a vertical position. Location of a sectional view for FIG. 2 is indicated by notation A-A.

Figure 2:
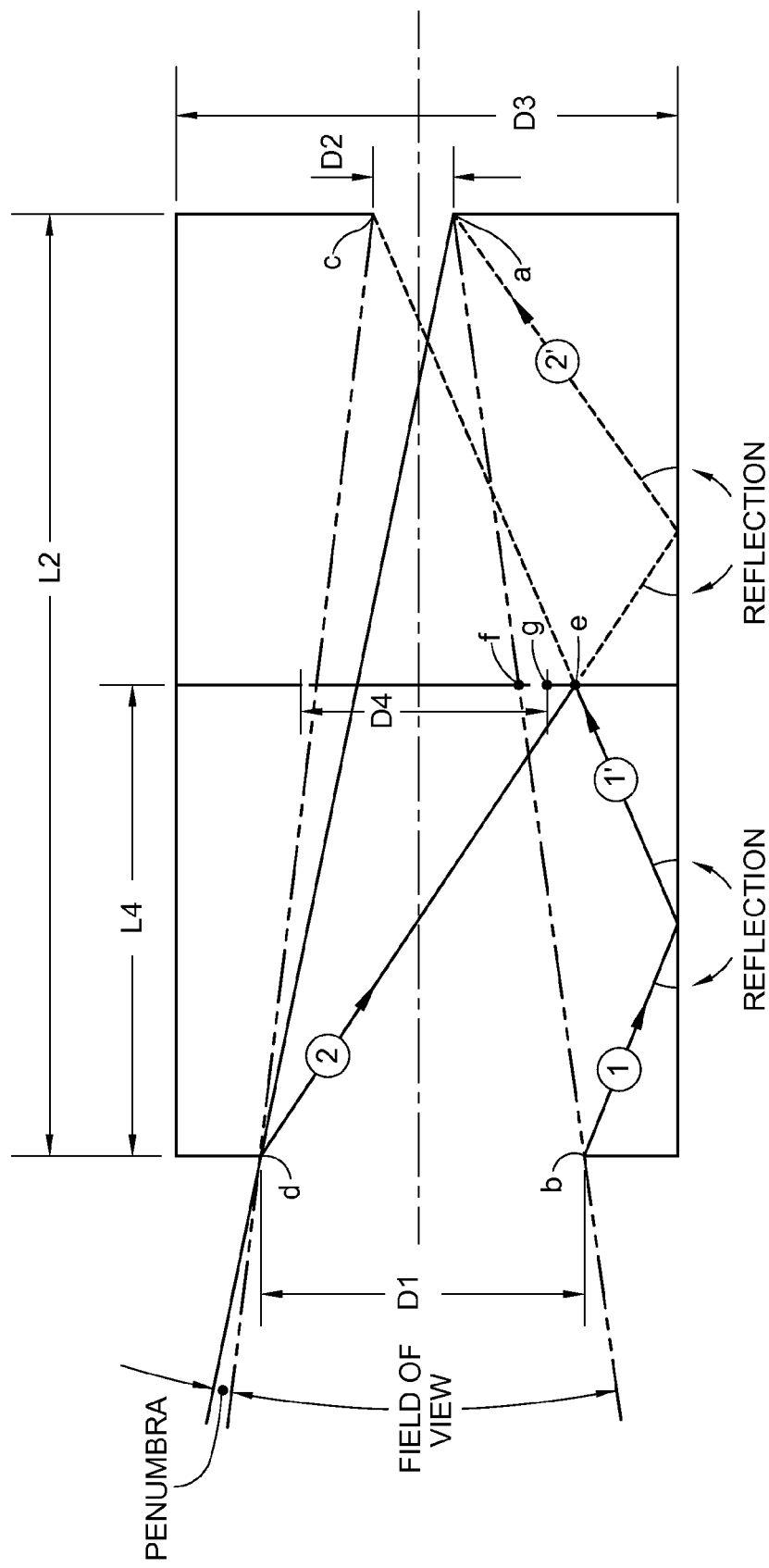
FIG. 2 illustrates a graphical display of light rays critical to operation of each sensing element.

FIG. 2 is a graphical representation of cross section A-A in FIG. 1. Light enters the element at circular aperture D1 for detection by sensor D2 at a distance of L2 beyond D1. The sensing field of view is defined by conical frustum a-b-c-d.

In absence of any blocking baffle, undesirable stray light rays 1 and 2 entering D1 are reflected on the inside tubular wall of D3 such that reflected ray 1' could intersect D2 at point c, and reflected ray 2' could intersects D2 at point a. With said rays 1 and 2 falling outside the desired sensing field of view, it is necessary to block 1 and 2 from reaching points a and c at the edges of D2.

The location of intersection of rays 1' and 2 at point e is controlled by inside diameter D3 such that point e falls outside view field edge a-b at point f, an axial distance L4 from aperture D1. It follows that an annular baffle located at said axial location L4 blocks rays 1' and 2 at point e when aperture D4 edge is at point g, between points e and f.

Accurate construction of the foregoing baffling in combination with a relatively small finite detector size D2 passes a small penumbra of annular rays defined by angle a-d-c thereby creating insignificant fuzziness of detection edge of sensing field of view a-b-c-d.

The baffling arrangement in FIG. 2 prevents all rays outside the sensing Field of View and the aforementioned penumbra from reaching any part of detector D2 without two or more reflections from low reflectance surfaces on the entire interior of the sensing element.

Figure 3:
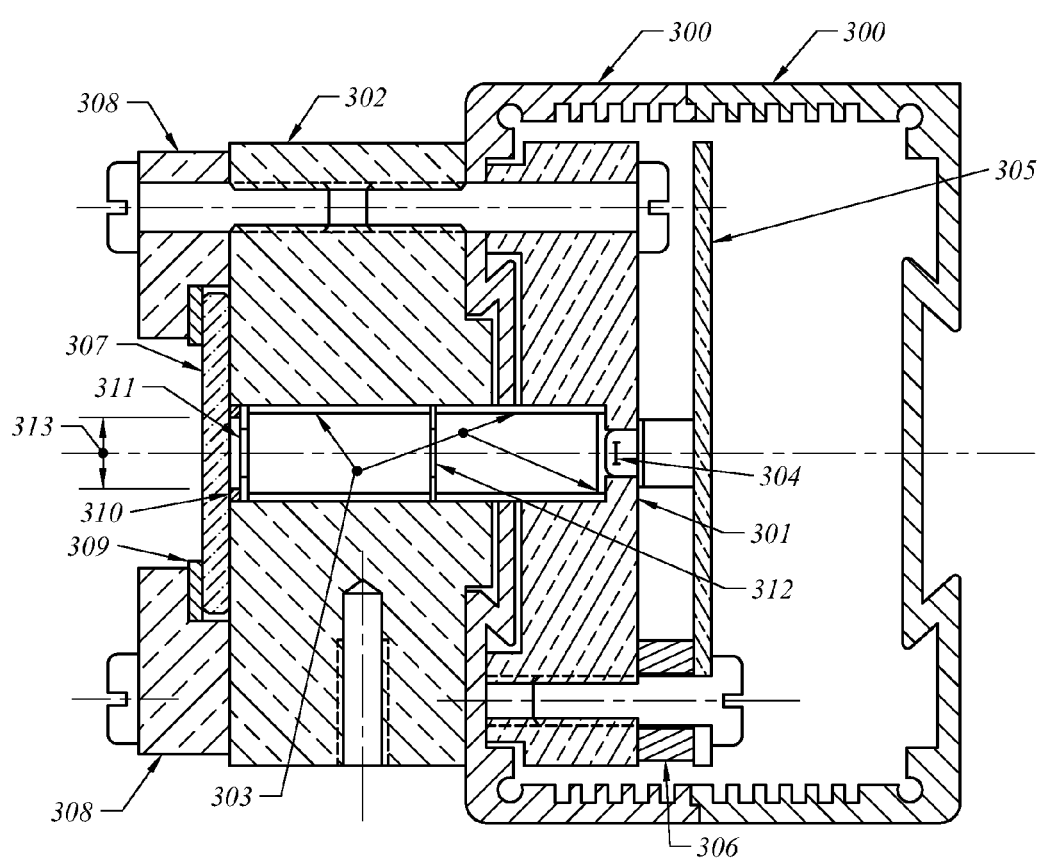
FIG. 3 illustrates an engineering drawing cross section of each element in the sensing array.

Referring to FIG. 3, this cross section shows typical element hardware at location A-A in FIG. 1. The packaging enclosure consists of a metal extrusion housing constructed in two halves 300. Clamped to both interior and exterior of said enclosure 300 are two strips of plastic 301 and 302. Said strips 301 and 302 enclose the components of a light baffle system consisting of baffle liners 303 comprised of two cylindrical portions and an aperture at an opening for photodiode sensor 304 electronically mounted on an electronic circuit board 305. A means for mounting said circuit board 305 is a series of screw fasteners represented at insulated standoff 306.

Sealing the sensing element enclosure cavity is window 307 held in place by a plastic set of rails 308 beneath which are resilient seals 309. Adjacent to the inside window face is a spacer ring 310 clamping retaining baffle apertures 311 and 312 spaced between said cylindrical baffle liners 303.

The resulting sensor 304 and baffle components 303, 311, and 312 complete the means of sensing light in a limited cone view 313 as previously described in FIG. 2.

Figure 4:
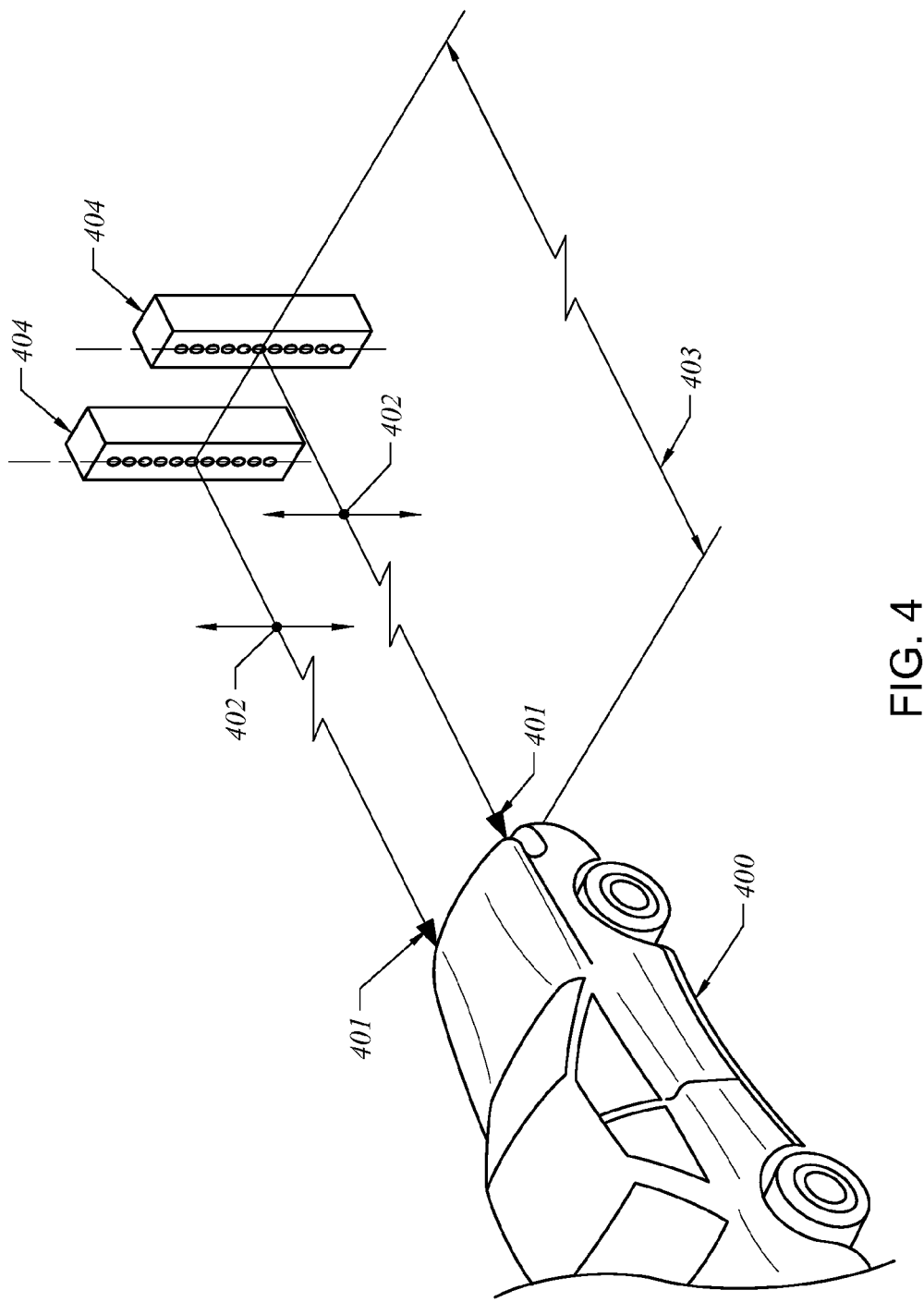
FIG. 4 illustrates a typical layout of sensor arrays relative to a vehicle being tested for headlamp vertical alignment.

Referring to FIG. 4, an embodiment of the patent subject beam array is a means to detect vertical aiming of vehicle 400 headlamp beams 401 in a vertical direction 402. The U.S. DOT specifies detection distance 403 between headlamps 401 and smart sensor arrays 404 as 25 feet. The basic ZERO reference for headlamp alignment is a horizontal plane emanating from headlamps 401 and intersecting sensor arrays 404. The smart sensors accomplish sensing beam height deviations from the required reference plane at the sensors 404.

Figure 5:
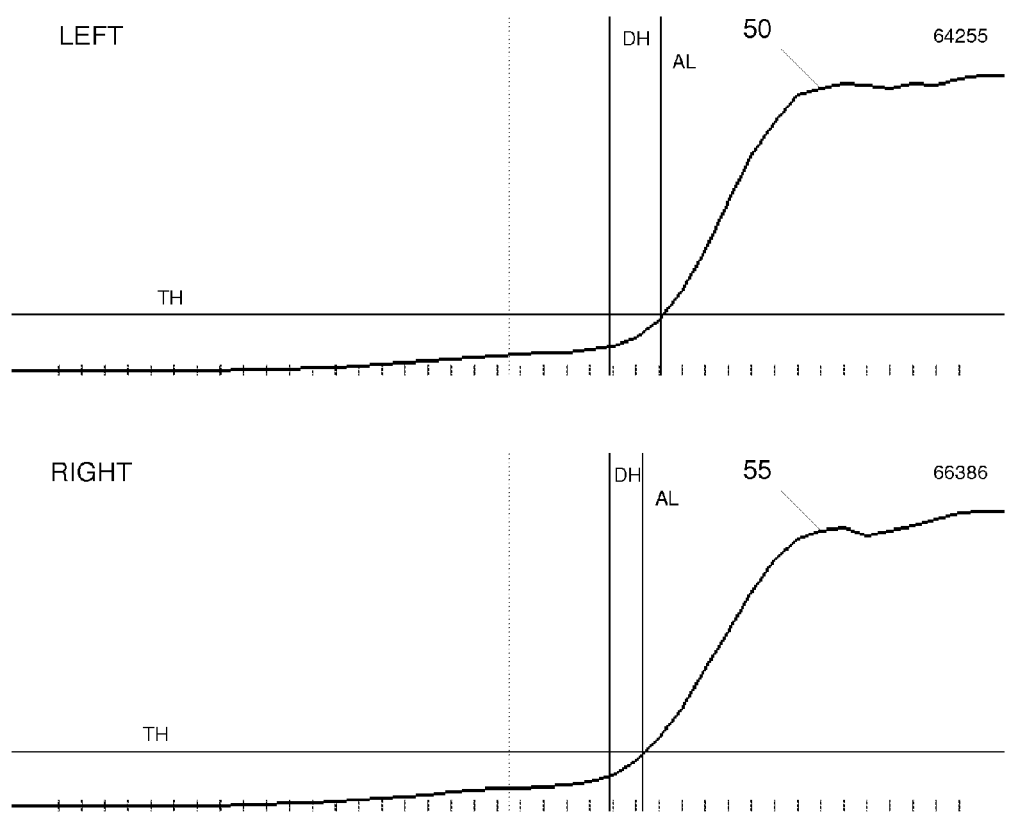
FIG. 5 illustrates plots of headlamp beam intensity as gathered by sensors for locating beam tops.

Referring to FIG. 5, beam profile data in the form of illumination curves 50 and 55 from smart sensor arrays permits detection of headlamp beam vertical alignment (i.e. –Headlamp aim audit). Note that "UP" is on the LEFT, and detected beam intensity is on the RIGHT.

The foregoing descriptions of the embodiments of the present invention have been presented for purposes of illustration and description only. They are not intended to be exhaustive or to limit the present invention to the forms disclosed. Accordingly, many modifications and variations will be apparent to practitioners skilled in the art. The scope of present invention is defined by the appended claims.

The invention claimed is:

1. An apparatus for baffling light in a headlamp aim detection sensor comprising:
   a block comprising one or more holes formed therein, each of said holes having positioned inside:
   a first ring with a hole forming a first aperture;
   a second ring with a hole forming a second aperture, wherein said first ring and said second ring are spaced apart and oriented to allow light to travel through both apertures;
   a photosensor positioned to receive light through said first aperture and said second aperture, wherein said first aperture and said second aperture limits the field of view of said photosensor to substantially eliminate light from a second headlamp when a first headlamp is being detected, wherein said first headlamp and said second headlamp are in predetermined locations relative to said block and are horizontally displaced from each other.

2. The apparatus of claim 1 wherein said block comprises a linear array of a plurality of holes.

3. The apparatus of claim 2 wherein said linear array is oriented vertically and positioned a predetermined distance from a vehicle being audited.

4. The apparatus of claim 1 wherein said photosensor is coupled to an electronic sensor unit capable of sampling a light level.

5. The apparatus of claim 4 wherein said electronic sensor unit is disposed on a printed circuit board mounted to said block.

6. The apparatus of claim 1 further comprising a window covering said one or more holes.

7. A method for baffling light in a headlamp aim detection sensor comprising the steps of:
   providing a block comprising one or more holes formed therein, each of said holes having positioned inside:
   a first ring with a hole forming a first aperture;
   a second ring with a hole forming a second aperture, wherein said first ring and said second ring are spaced apart and oriented to allow light to travel through both apertures;
   a photosensor positioned to receive light through said first aperture and said second aperture, wherein said first aperture and said second aperture limits the field of view of said photosensor to substantially eliminate light from a second headlamp when a first headlamp is being detected;
   positioning a vehicle comprising a first vehicle headlamp and a second vehicle headlamp a predetermined distance from said block, such that said first headlamp and said second headlamp are in predetermined locations relative to said block and are horizontally displaced from each other;
   energizing said first vehicle headlamp and said second vehicle headlamp;
   sensing a light level on said photosensor.

8. The method of claim 7 wherein said block comprises a linear array of a plurality of holes.

9. The method of claim 8 wherein said linear array is oriented vertically and positioned a predetermined distance from a vehicle being audited.

10. The method of claim 7 wherein said photosensor is coupled to an electronic sensor unit capable of sampling a light level.

11. The method of claim 10 wherein said electronic sensor unit is disposed on a printed circuit board mounted to said block.

12. The method of claim 7 further comprising the step of:
   providing a window covering said one or more holes.

* * * * *